United States Patent [19]

Danciger et al.

[11] 3,902,931
[45] Sept. 2, 1975

[54] UNIVERSAL FASTENER AND BRACKET

[76] Inventors: David K. Danciger, 6204 Curzon; Gordon R. England, 21 Legend Rd., both of Fort Worth, Tex. 76116; Charles E. Way, 4117 Warnock Ct., Fort Worth, Tex. 76109

[22] Filed: Oct. 25, 1973

[21] Appl. No.: 409,398

[52] U.S. Cl. ............... 248/230; 248/72; 248/226 A
[51] Int. Cl.² ........................................ F16M 13/00
[58] Field of Search .......... 248/51, 72, 221, 226 A, 248/295, 296, 230; 52/484

[56] References Cited
UNITED STATES PATENTS

| | | | |
|---|---|---|---|
| 1,789,815 | 1/1931 | Hanley | 248/226 A |
| 2,055,759 | 9/1936 | Venzie | 52/484 X |
| 2,389,965 | 11/1945 | Eckel | 52/484 X |
| 2,994,501 | 8/1961 | Barnard | 248/226 A |
| 2,996,570 | 8/1961 | Wilson | 248/72 X |
| 2,998,477 | 8/1961 | Hollander | 248/226 A X |
| 3,005,613 | 10/1961 | Majewski | 248/226 A |
| 3,276,800 | 10/1966 | Loudon | 248/72 X |

FOREIGN PATENTS OR APPLICATIONS

| | | | |
|---|---|---|---|
| 6,404,769 | 11/1965 | Netherlands | 248/72 |

*Primary Examiner*—William H. Schultz
*Attorney, Agent, or Firm*—Kenneth R. Glaser

[57] ABSTRACT

Disclosed is a universal clamp or fastener adapted to be secured to objects of various sizes and shapes, the clamp comprising an object receiving body having a pair of opposed legs, one of the legs having adjacently disposed portions bearing unique angular relationships to one another, and a translatably mounted extension co-acting with the leg portions to grip the object. The universal fastener is employed as a hanging support or bracket for miscellaneous articles.

1 Claim, 3 Drawing Figures

PATENTED SEP 2 1975                                    3,902,931
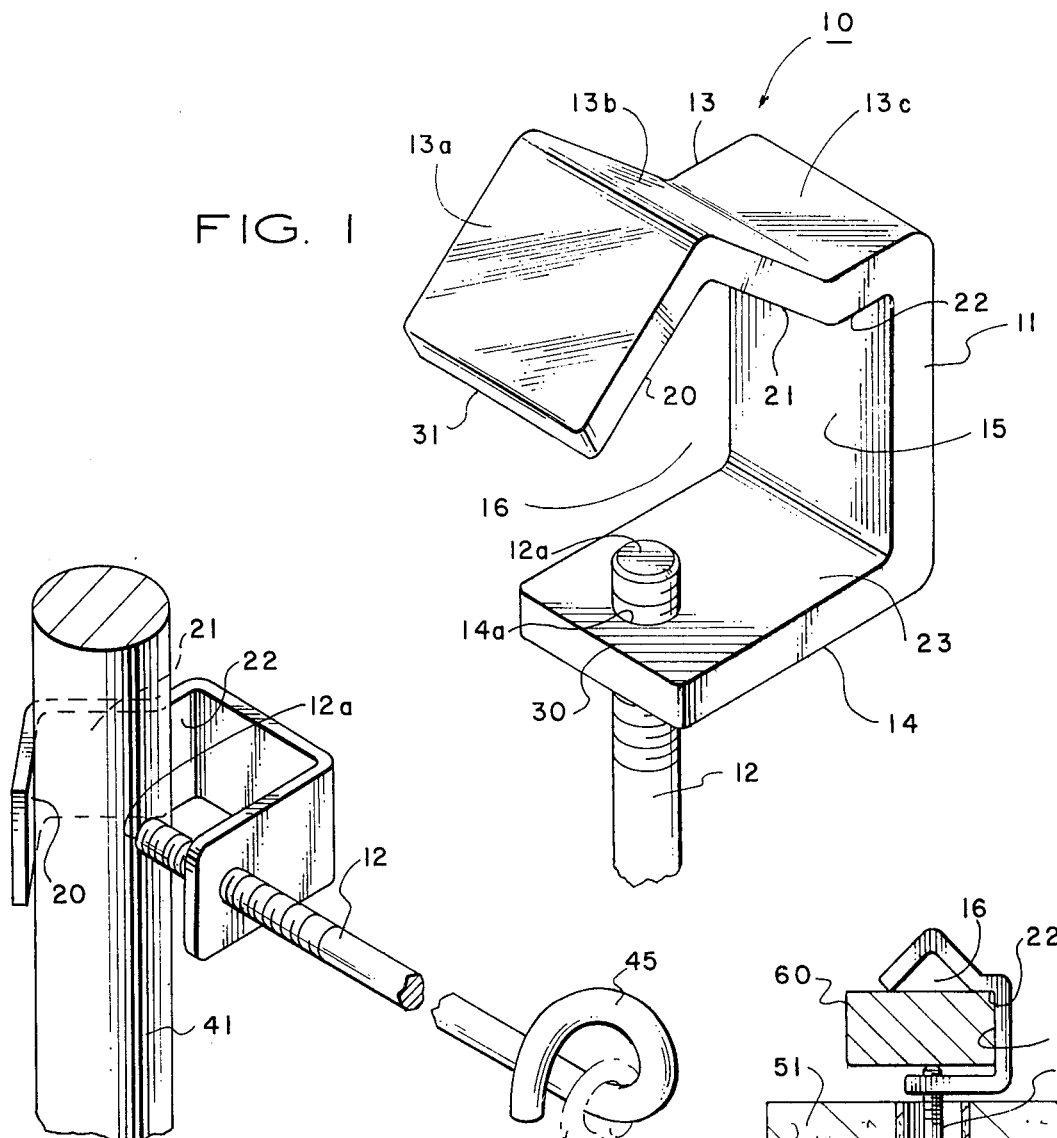
FIG. 1
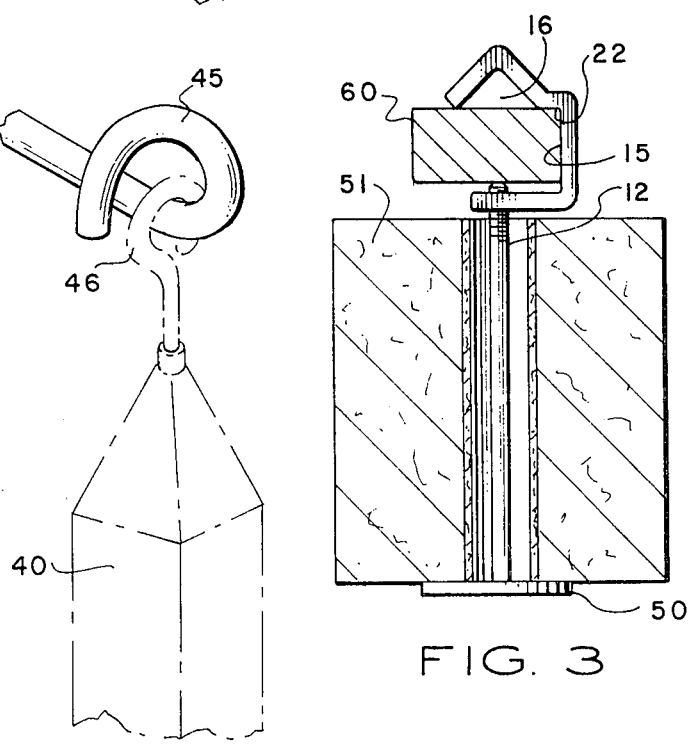
FIG. 2
FIG. 3

UNIVERSAL FASTENER AND BRACKET

This invention pertains to fasteners, more particularly to universal fasteners, and even more particularly to universal fasteners employed as hanging bracket supports.

There are many applications that require one object to be coupled to another. For example, when an article is to be suspended or hung from a pole, ledge, or the like, suitable fastening means must be employed to effect this suspension. However, since the objects to which the articles are to be secured are often of different respective shapes and sizes, it has been necessary, in order to effect a secure coupling, to also utilize fasteners of correspondingly different sizes and shapes. Thus, an undesirably large number of fasteners or clamps are required.

It is therefore a primary object of the invention to provide a new and improved fastener.

It is a further object of the invention to provide a new and improved fastener adapted to universally clamp onto objects of varying sizes and shapes.

It is an even further object of the invention to provide a new and improved universal clamp employed as an integral part of a hanging bracket support.

In accordance with these and other objects, the present invention is directed to a universal clamp or fastener adapted to be secured to objects of various sizes and shapes, the clamp comprising an object receiving body having a pair of opposed legs, one of the legs having adjacently disposed portions bearing unique angular relationships to one another, and a translatably mounted extension co-acting with the leg portions to grip the object. In accordance with alternate embodiments of the invention, the universal fastener is employed as a hanging support or bracket for miscellaneous articles.

Additional features, as well as other objects and advantages, of the present invention will become readily apparent from the following detailed description taken in conjunction with the drawings wherein like numerals refer to like parts and in which:

FIG. 1 is a pictorial view of the fastener or clamp of the present invention;

FIG. 2 is a pictorial view of the clamp illustrated in FIG. 1 showing its use as one type of hanging bracket support; and FIG. 3 is a pictorial view of the clamp illustrated in FIG. 2 showing its use as another type of hanging bracket support.

Referring initially to FIG. 1, the fastening means or clamp in accordance with the present invention is broadly depicted by the reference numeral 10 and includes a main body portion 11 and a cooperating stem or shaft 12. The body 11 comprises opposed leg portions 13 and 14 extending from, and joined by, a wall portion 15, and defining therebetween an opening or gap 16.

The shaft 12 transversely intersects the leg 14, preferably at a right angle thereto, and has an end portion 12a extending into the opening 16. Furthermore, the stem 12 is translatably mounted through an opening 14a in the leg 14 in a manner that enables the end 12a to be positioned at varying distances from the opposed leg portion 13. In accordance with a specific embodiment thereof, the end 12a is threadably received within the opening in the leg 14 to effect this relative positioning. Thus, the clamp 10 is adapted to receive, and can retain, within the gap 16 objects having different dimensions and outside diameters.

In accordance with a unique feature of the present invention, the leg 13 comprises adjacent leg portions 13a, 13b, and 13c bearing unique relationships to one another, as well as to the opposed leg 14. Specifically, adjacent sections 13a and 13b have their respective object engaging surfaces 20 and 21 angularly disposed with respect to one another, preferably at 90°. Leg portion 13c, on the other hand, has a flat object engaging surface 22 parallel to the flat surface 23 of leg 14, the surface 22 also being angularly disposed with respect to the object engaging surface 21 of the leg portion 13b. Additionally, the height of the entrance to the opening 16 (distance between the forward edge 30 of the leg 14 and the forward edge 31 of the leg 13) is at least equal to the distance between the surfaces 22 and 23. In accordance with a preferred form of the invention, the edge 31 will be coplanar with the surface 22 to facilitate the engagement of flat surfaces by the clamp 10.

As a consequence of the just described shape of the body 11, the clamp 10 can not only be secured to objects having arcuate or circular shaped external surfaces, but can also be securely clamped to objects having rectangular outer surfaces. This advantage, and two examples of how such features may be employed, are illustrated in FIGS. 2 and 3 in the drawings.

Specifically, and with reference to FIG. 2, the clamp of the present invention is integrally incorporated into a hanger or bracket support assembly for suspending an article, such as a lantern 40, at a position laterally spaced from a cylindrical pole 41. Accordingly, the adjustable shaft 12 has a handle engaging portion 45 at an end remote from the end 12a and which is adapted to receive the lantern hanger 46. As viewed in FIG. 2, the cylindrical surface of the pole 41 is secured against the angularly disposed surfaces 20 and 21 by the end 12a.

Referring now to FIG. 3, a rectangular object 60 (such as a table ledge or the like) is received within the opening 16 and in this embodiment is held against the flat surface 22 (and wall 15) by the stem 12. In this embodiment, the shaft 12 has its remote end formed as a circular extension 50 which holds a roll of paper 51 on the shaft.

It can thus be seen that by employing the structure in accordance with the present invention, a retainer or clamp is provided which is universally adapted to receive, and retain therein, objects of varying sizes and shapes. Various modifications to the disclosed embodiments may be effected while still providing this inherent universal clamping advantage. For example, in some instances it may be desirable to provide, at and extending forwardly from the forward edge 31 of leg portion 13a, an additional flat object engaging surface coplanar with the surface 22. The resulting structure of the body 11 would then include the "V" shaped configuration (portions 13a and 13b) for engaging circular objects and a pair of "flats" symmetrically disposed about the V for engaging rectangular objects.

Various other modifications of the disclosed embodiments, as well as other embodiments of the invention, may become apparent to persons skilled in the art without departing from the spirit and scope of the invention as defined by the appended claims.

What is claimed is:

1. Clamping means adapted for interchangeable retention of both an object of rectangular cross-section as well as an object of circular cross-section, said clamping means comprising:
   a. a single body defined by a flat wall portion and a pair of opposed legs transversely and non-movably joined to said wall portion, each of said opposed legs having respective flat surface portions parallel to one another and intersecting said wall portion at a 90° angle thereto,
   b. one of said opposed legs further comprising first and second leg portions angularly intersecting one another to define a generally V-shaped groove having its apex facing the other one of said opposed legs, the said first leg portion intersecting the flat surface portion of said one opposed leg, the said second leg portion having a forward edge coplanar with the flat surface portion of said one opposed leg, the angle of intersection of said first and second leg portions being such as to enable the object of circular cross-section to be positioned within the confines of said V-shaped groove with the first and second leg portions engaging the circumference of said circular cross-section object to restrain said circular cross-section object against lateral movement, and
   c. shaft means translatably and threadably mounted through an opening in said other opposed leg, said shaft means having its end portion aligned at all times during its translation with the apex of said V-shaped groove, said shaft adapted to urge said circular cross-section object within said V-shaped groove and against said first and second leg portions, said shaft additionally adapted to urge said rectangular cross-section object against said forward edge as well as against the flat surface portion of said one opposed leg, the flat wall portion of said single body preventing the lateral rotation of said rectangular cross-section object.

* * * * *